United States Patent
Moore

(10) Patent No.: US 10,932,964 B2
(45) Date of Patent: Mar. 2, 2021

(54) MODULAR WHEELCHAIR SYSTEM

(71) Applicant: Toyota Motor Engineering & Manufacturing North America, Inc., Plano, TX (US)

(72) Inventor: Douglas A. Moore, Fairview, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 424 days.

(21) Appl. No.: 15/937,071

(22) Filed: Mar. 27, 2018

(65) Prior Publication Data
US 2019/0298594 A1    Oct. 3, 2019

(51) Int. Cl.
G05D 1/00 (2006.01)
A61G 5/04 (2013.01)
G05D 1/02 (2020.01)

(52) U.S. Cl.
CPC .............. *A61G 5/047* (2013.01); *A61G 5/04* (2013.01); *G05D 1/0088* (2013.01); *G05D 1/0225* (2013.01); *G05D 1/0246* (2013.01); *A61G 2203/22* (2013.01); *A61G 2203/30* (2013.01); *A61G 2203/72* (2013.01); *G05D 1/0238* (2013.01); *G05D 1/0255* (2013.01); *G05D 1/0257* (2013.01); *G05D 1/0259* (2013.01); *G05D 2201/0206* (2013.01)

(58) Field of Classification Search
CPC ...... A61G 5/047; A61G 5/04; A61G 2203/22; A61G 2203/30; A61G 2203/72; G05D 1/0088; G05D 1/0225; G05D 1/0246; G05D 1/0238; G05D 1/0255; G05D 1/0257; G05D 1/0259; G05D 2201/0206; G05D 1/00

USPC .......................................... 701/22; 280/250.1
See application file for complete search history.

(56) References Cited

U.S. PATENT DOCUMENTS 9,585,801 B2    3/2017  Halsall
2003/0030243 A1*  2/2003  Engels .................. A61G 5/045
                                                                280/250.1

(Continued)

FOREIGN PATENT DOCUMENTS

KR          101305336 B1    9/2013
KR      101306336 D1        9/2013

(Continued)

OTHER PUBLICATIONS

Extended European Search Report for EP19164140.6 dated Jun. 6, 2019.

(Continued)

*Primary Examiner* — Shardul D Patel
(74) *Attorney, Agent, or Firm* — Dinsmore & Shohl LLP

(57) ABSTRACT

The modular wheelchair system includes an upper component, and an autonomous power base configured to detachably couple to the upper component. The autonomous power base includes one or more processors, one or more memory modules, and machine readable instructions stored in the one or more memory modules that, when executed by the one or more processors, cause the autonomous power base to: determine whether the upper component is separated from the autonomous power base; and navigate to a location in response to determination that the upper component is detached from the autonomous power base.

17 Claims, 5 Drawing Sheets

(56) References Cited

U.S. PATENT DOCUMENTS

| | | | | |
|---|---|---|---|---|
| 2006/0131943 A1* | 6/2006 | Iwatani | ............... | B60N 2/14 |
| | | | | 297/344.21 |
| 2008/0046298 A1* | 2/2008 | Ben-Yehuda | ........ | G06Q 10/109 |
| | | | | 705/6 |
| 2012/0029697 A1* | 2/2012 | Ota | ............... | B66F 9/063 |
| | | | | 700/253 |
| 2016/0022517 A1* | 1/2016 | Frangos | ............... | A61G 5/1054 |
| | | | | 280/657 |
| 2017/0215979 A1* | 8/2017 | Childs | ............... | A61M 5/1415 |
| 2018/0214328 A1* | 8/2018 | Cheek | ............... | A61G 7/1001 |
| 2018/0221226 A1* | 8/2018 | Moore | ............... | A61H 1/0237 |
| 2019/0228465 A1* | 7/2019 | Moore | ............... | G06Q 30/0645 |
| 2019/0231619 A1* | 8/2019 | Moore | ............... | G16H 40/67 |
| 2019/0282431 A1* | 9/2019 | Moore | ............... | A61H 1/0237 |

FOREIGN PATENT DOCUMENTS

| | | |
|---|---|---|
| KR | 101771878 B1 | 9/2017 |
| WO | 2008151345 A2 | 12/2008 |
| WO | 2012042458 A1 | 4/2012 |
| WO | 2017039546 A1 | 3/2017 |

OTHER PUBLICATIONS

Peter Mayer, et al., "MOVEMENT—Modular Versatile Mobility Enhancement System," 2007 IEEE International Conference on Robotics and Automation, Roma, Italy, Apr. 10, 2007.

* cited by examiner

MODULAR WHEELCHAIR SYSTEM

TECHNICAL FIELD

The present specification generally relates to modular wheelchair systems and, more specifically, to modular wheelchair systems that includes an autonomous power base and a chair component detachably coupled to the autonomous power base.

BACKGROUND

Conventional wheelchairs are voluminous and need to be placed in a storage area when a user of the wheelchair gets off the wheelchair and sits on the seat of other transportation (e.g., vehicles, airplanes, etc.). The user may need another person's help to place the wheelchair in a storage area.

Accordingly, a need exists for a wheelchair system that a user can use without another person's help.

SUMMARY

In one embodiment, a modular wheelchair system includes an upper component, and an autonomous power base configured to detachably couple to the upper component. The autonomous power base includes one or more processors, one or more memory modules, and machine readable instructions stored in the one or more memory modules that, when executed by the one or more processors, cause the autonomous power base to: determine whether the upper component is separated from the autonomous power base; and navigate to a location in response to determination that the upper component is detached from the autonomous power base.

In another embodiment, an autonomous power base includes a coupling mechanism configured to couple with an upper component, one or more processors, one or more memory modules, and machine readable instructions stored in the one or more memory modules that, when executed by the one or more processors, cause the autonomous power base to: determine whether the upper component is detached from the autonomous power base, and navigate to a location in response to determination that the upper component is detached from the autonomous power base.

In yet another embodiment, a modular wheelchair system includes an upper component, and an autonomous power base configured to detachably couple to the upper component. The autonomous power base includes one or more processors, one or more memory modules, and machine readable instructions stored in the one or more memory modules that, when executed by the one or more processors, cause the autonomous power base to: determine whether the autonomous power base arrives at a destination, locate the upper component detached from the autonomous power base, and move to a predetermined location proximate to the upper component in response to determination that the autonomous power base arrives at the destination.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments described herein are directed to a modular wheelchair system. The modular wheelchair system includes an upper component, and an autonomous power base configured to detachably couple to the upper component. The autonomous power base includes one or more processors, one or more memory modules, and machine readable instructions stored in the one or more memory modules that, when executed by the one or more processors, cause the autonomous power base to: determine whether the upper component is separated from the autonomous power base; and navigate to a location in response to determination that the upper component is detached from the autonomous power base. The present modular wheelchair system allows a user to detach the upper component (e.g., a customized chair) from the power base and continue to use the upper component. For example, when a user gets on a vehicle, he can continue to use the customized chair by placing the chair on a manual base within the vehicle. When the upper component is detached from the autonomous power base, the autonomous power base may drive to a predetermined area (e.g., a docking station) autonomously such that the user does not need any help from a third party. In addition, because the autonomous power base is detached from the upper component, the autonomous power base may be placed within a relatively small space.

Figure 1:
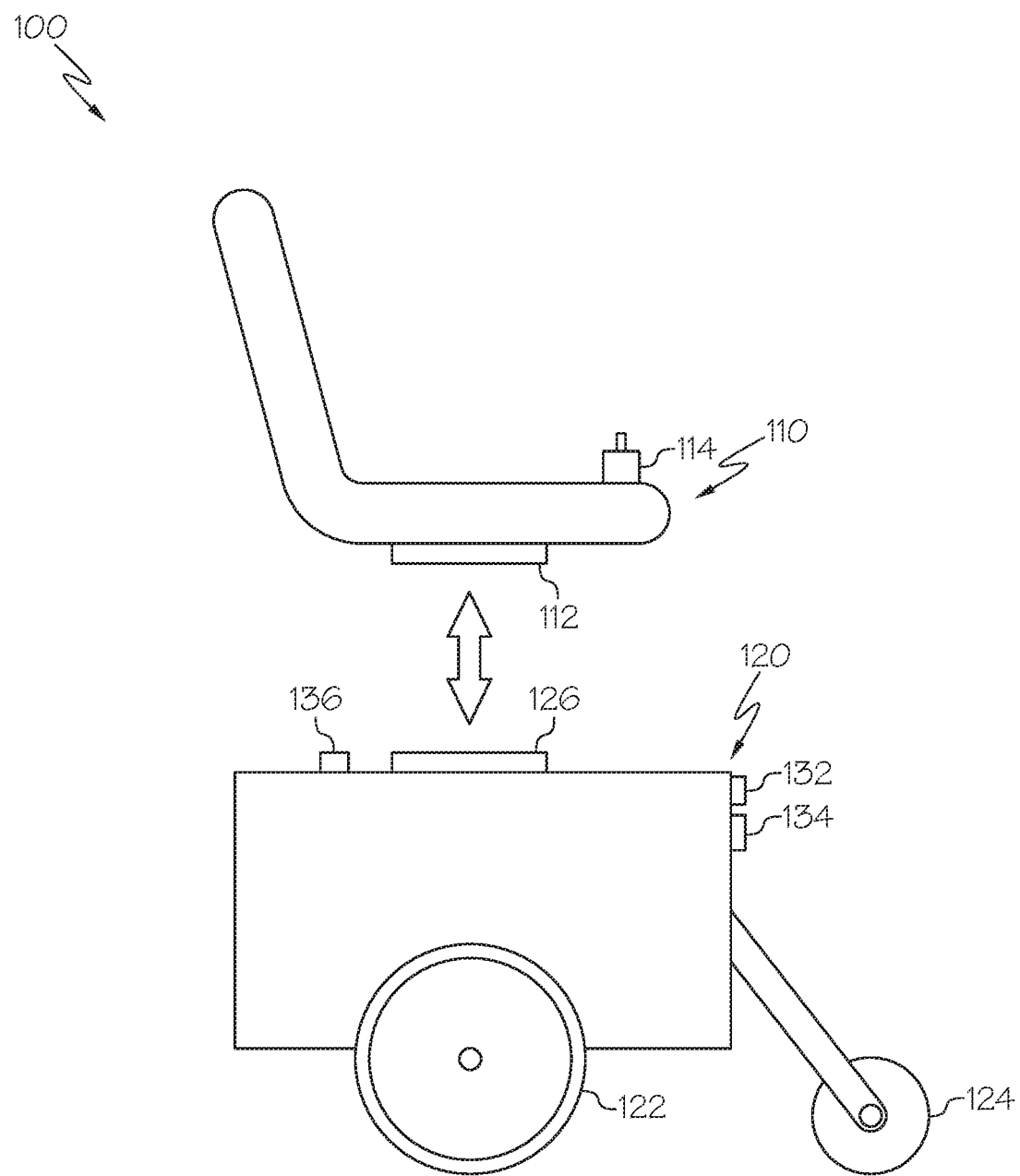
FIG. 1 depicts a modular wheelchair system according to one or more embodiments shown and described herein.

Referring now to FIG. 1, one embodiment of a modular wheelchair 100 is described. The modular wheelchair 100 includes an upper component 110 and an autonomous power base 120. In embodiments, the upper component 110 may be a chair configured to support a user of the modular wheelchair 100. In some embodiments, the upper component 110 may be a component configured to support an object, for example, a plate for carrying food, etc. The upper component 110 may include a user interface 114 and a coupling mechanism 112. The user interface 114 may be an input device configured to receive instructions from a user for moving the modular wheelchair 100. For example, the input device may be a joystick which the user can manipulate to operate the modular wheelchair 100. The user may control the moving direction and speed of the autonomous power base 120 by controlling the joystick. The user interface 114 may be communicatively coupled to the autonomous power base 120 in order to send instructions to the autonomous power base 120, which will be described below with reference to FIG. 2.

The autonomous power base 120 may include one or more main wheels 122 and one or more assistance wheels 124. In some embodiments, the autonomous power base 120 may not include one or more assistance wheels 124. In some embodiments, the autonomous power base 120 may have self-balancing functions based on yaw, pitch and/or roll data obtained by sensors, for example, gyroscope sensors, accelerometers, etc.

The autonomous power base 120 may include a coupling mechanism 126 configured to couple with the coupling mechanism 112 of the upper component 110. The coupling mechanism 126 and the coupling mechanism 112 may be any mechanical coupling mechanism that couples the autonomous power base 120 with the upper component 110. For example, the coupling mechanism 126 may be a female coupling section and the coupling mechanism 112 may be a male coupling section. In some embodiments, the coupling mechanism 126 and the coupling mechanism 112 are magnetic components that attract each other to couple.

The autonomous power base 120 includes one or more cameras 132, one or more proximity sensors 134, and a coupling detection sensor 136. The one or more cameras 132 and the one or more proximity sensors 134 may be used to allow the autonomous power base 120 to drive autonomously. In some embodiments, the autonomous power base 120 may not include one or more cameras 132. The coupling detection sensor 136 detects whether the upper component 110 is coupled to the autonomous power base 120. In some embodiments, the autonomous power base 120 may not include the coupling detection sensor 136. The details of the one or more cameras 132, the one or more proximity sensors 134, and the coupling detection sensor 136 will be described in detail with reference to FIG. 2 below.

Figure 2:
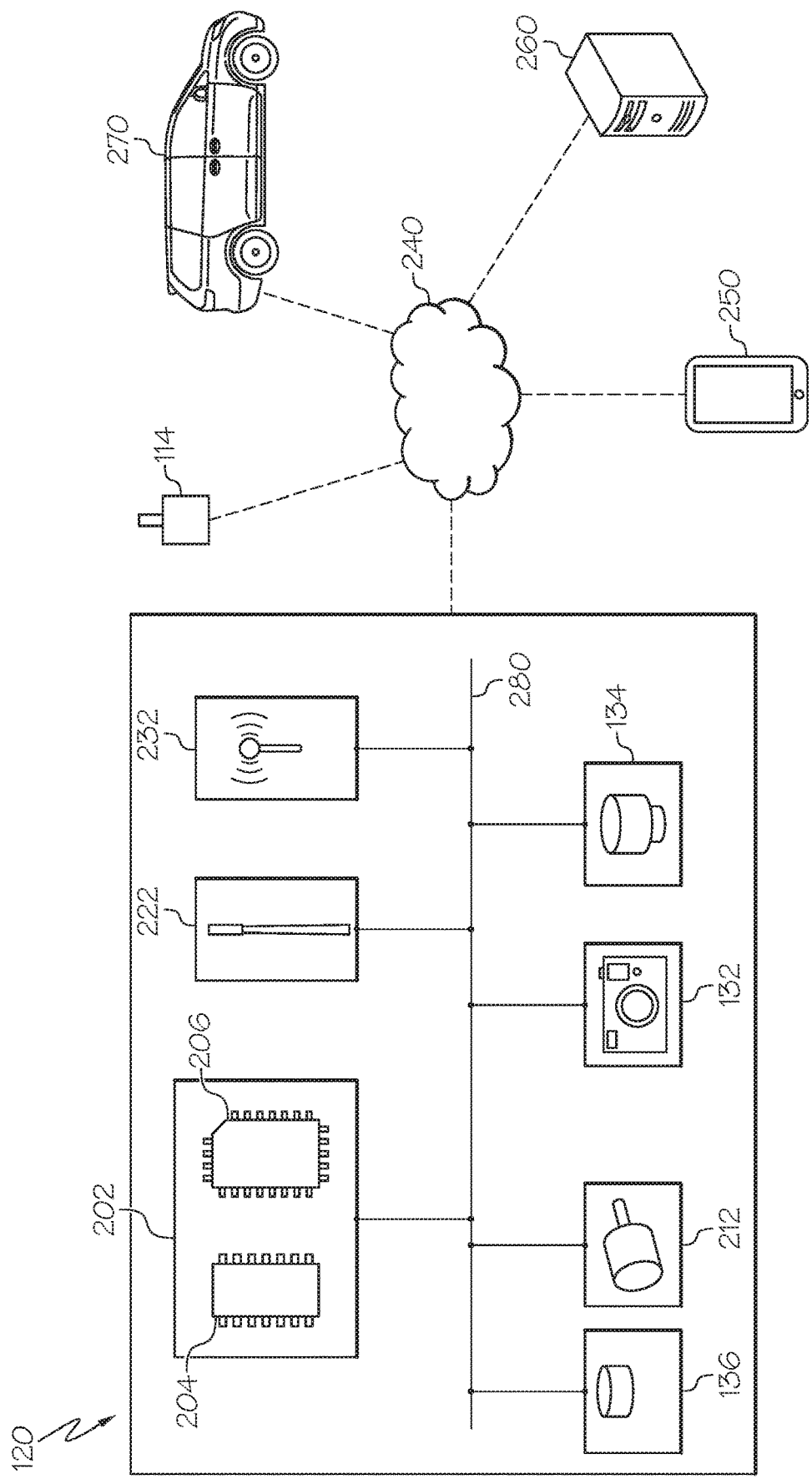
FIG. 2 schematically depicts an autonomous power base of the modular wheelchair communicating with external elements, according to one or more embodiments shown and described herein.

FIG. 2 schematically depicts an autonomous power base 120, according to one or more embodiments shown and described herein. The autonomous power base 120 includes a controller 202 that includes one or more processors 204 and one or more memory modules 206. Each of the one or more processors 204 may be any device capable of executing machine readable and executable instructions. Accordingly, each of the one or more processors 204 may be a controller, an integrated circuit, a microchip, a computer, or any other computing device. The one or more processors 204 are coupled to a communication path 280 that provides signal interconnectivity between various modules of the autonomous power base 120. Accordingly, the communication path 280 may communicatively couple any number of processors 204 with one another, and allow the modules coupled to the communication path 280 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 280 may be formed from any medium that is capable of transmitting a signal such as, for example, conductive wires, conductive traces, optical waveguides, or the like. In some embodiments, the communication path 280 may facilitate the transmission of wireless signals, such as Wi-Fi, Bluetooth, Near Field Communication (NFC) and the like. Moreover, the communication path 280 may be formed from a combination of mediums capable of transmitting signals. In one embodiment, the communication path 280 comprises a combination of conductive traces, conductive wires, connectors, and buses that cooperate to permit the transmission of electrical data signals to components such as processors, memories, sensors, input devices, output devices, and communication devices. Accordingly, the communication path 280 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 206 are coupled to the communication path 280. The one or more memory modules 206 may comprise RAM, ROM, flash memories, hard drives, or any device capable of storing machine readable and executable instructions such that the machine readable and executable instructions can be accessed by the one or more processors 204. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring to FIG. 2, the autonomous power base 120 includes one or more electric motors 212 that are coupled to the communication path 280. The one or more electric motors 212 are connected to the one or more main wheels 122 (See FIG. 1) and provide torque to the one or more main wheels 122. The one or more electric motors are coupled to the communication path 280 and receive instructions from the controller 202. For example, the controller 202 may control the rotation speed and rotation direction of the one or more electric motors 212.

Referring still to FIG. 2, the autonomous power base 120 includes one or more cameras 132. The one or more cameras 132 may be any device having an array of sensing devices (e.g., pixels) capable of detecting radiation in an ultraviolet wavelength band, a visible light wavelength band, or an infrared wavelength band. The one or more cameras 132 may have any resolution. The one or more cameras 132 may include an omni-directional camera, or a panoramic camera.

The one or more cameras 132 are coupled to the communication path 280 and communicate with other components of the autonomous power base 120. The one or more cameras 132 may capture images of environment external to the autonomous power base 120. The one or more memory modules 206 may include instructions for processing images received from one or more cameras 132. For example, the one or more processors 204 implement the instructions in the one or more memory modules 206 to process an image from the one or more cameras 132 to identify objects proximate to the autonomous power base 120. Any image processing technology may be used to process images from the one or more cameras 132. Based on the identified objects, the controller 202 may control the orientation and speed of the autonomous power base 120, for example, by controlling the one or more electric motors 212 to drive the autonomous power base 120.

Referring still to FIG. 2, the one or more proximity sensors 134 are coupled to the communication path 280. The one or more proximity sensors 134 detect a distance between the one or more proximity sensors 134 and an object nearby and communicate the proximity information to the controller 202 of the autonomous power base 120. The one or more proximity sensors 134 may be any device capable of outputting a proximity signal indicative of the proximity of an object to the one or more proximity sensors 134. In some embodiments, the one or more proximity sensors 134 may include laser scanners, capacitive displacement sensors, Doppler Effect sensors, eddy-current sensors, ultrasonic sensors, magnetic sensors, optical sensors, radar sensors, sonar sensors, LIDAR sensors or the like. Some embodiments may not include the one or more proximity sensors 134. In some embodiments, the autonomous power base 120 may be configured to determine the presence of an obstacle proximate to the vehicle based on a signal from the one or more proximity sensors 134. Based on the identified obstacle, the controller 202 may control the orientation and speed of the autonomous power base 120, for example, by controlling the one or more electric motors 212 to drive the autonomous power base 120.

The coupling detection sensor 136 is coupled to the communication path 280. In embodiments, the coupling detection sensor 136 may be a proximity sensor that detects a distance between the coupling detection sensor 136 and the upper component 110 in FIG. 1 and communicates the proximity information to the controller 202 of the autonomous power base 120. In some embodiments, the coupling detection sensor 136 may be a weight sensor that measures a weight of an object on the autonomous power base 120. The one or more memory modules 206 may include instructions for determining whether a detachment event occurs based on data from the coupling detection sensor 136. For example, in some embodiments, the controller 202 continues to receive distance information from the coupling detection sensor 136 that detects a distance between the coupling detection sensor 136 and the upper component 110, and if the distance becomes greater than a threshold value, then the controller 202 determines that a detachment event occurred. As another example, the controller 202 continues to receive weight information from the weight sensor that measures a weight of an object on the autonomous power base 120, and if the weight becomes less than a threshold value, then the controller 202 determines that a detachment event occurred.

Referring still to FIG. 2, the autonomous power base 120 includes a satellite antenna 222 coupled to the communication path 280 such that the communication path 280 communicatively couples the satellite antenna 222 to other modules of the autonomous power base 120. The satellite antenna 222 is configured to receive signals from global positioning system satellites. Specifically, in one embodiment, the satellite antenna 222 includes one or more conductive elements that interact with electromagnetic signals transmitted by global positioning system satellites. The received signal is transformed into a data signal indicative of the location (e.g., latitude and longitude) of the satellite antenna 222 or an object positioned near the satellite antenna 222, by the one or more processors 204. The data signal may be used to determine the location of the autonomous power base 120 relative to other objects such as the upper component 110, a vehicle, etc. In some embodiments, the autonomous power base 120 does not include the satellite antenna 222.

The autonomous power base 120 includes the network interface hardware 232 for communicatively coupling the autonomous power base 120 with a mobile device 250, a remote server 260, a vehicle 270, or the user interface 114 of the upper component 110. The network interface hardware 232 is coupled to the communication path 280 such that the communication path 280 communicatively couples the network interface hardware 232 to other modules of the autonomous power base 120. The network interface hardware 232 may be any device capable of transmitting and/or receiving data via a wireless network. Accordingly, the network interface hardware 232 may include a communication transceiver for sending and/or receiving data according to any wireless communication standard. For example, the network interface hardware 232 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 232 includes a Bluetooth transceiver that enables the autonomous power base 120 to exchange information with the mobile device 250 (e.g., a smartphone) via Bluetooth communication.

Still referring to FIG. 2, data from various applications running on the mobile device 250 may be provided from the mobile device 250 to the autonomous power base 120 via the network interface hardware 232. The mobile device 250 may be any device having hardware (e.g., chipsets, processors, memory, etc.) for communicatively coupling with the network interface hardware 232 and the network 240. Specifically, the mobile device 250 may include an antenna for communicating over one or more of the wireless computer networks described above. Moreover, the mobile device 250 may include a mobile antenna for communicating with the network 240. Accordingly, the mobile antenna may be configured to send and receive data according to a mobile telecommunication standard of any generation (e.g., 1G, 2G, 3G, 4G, 5G, etc.). Specific examples of the mobile device 250 include, but are not limited to, smart phones, tablet devices, e-readers, laptop computers, or the like. In embodiments, the mobile device 250 may include software applications for controlling the autonomous power base 120. For example, a software application may send an instruction to the autonomous power base 120 that instructs the autonomous power base 120 to drive to the current location of the mobile device 250 along with the current location of the mobile device 250. As another example, a software application stored in the mobile device 250 may display a user interface similar to the user interface 114 such that the user of the mobile device 250 may control the driving direction and speed of the autonomous power base 120.

The network 240 generally includes a plurality of base stations that are configured to receive and transmit data according to mobile telecommunication standards. The base stations are further configured to receive and transmit data over wired systems such as public switched telephone network (PSTN) and backhaul networks. The network 240 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the network 240 may be utilized as a wireless access point by the network interface hardware 232 or the mobile device 250 to access one or more servers (e.g., a remote server 260). The remote server 260 generally includes processors, memory, and chipset for delivering resources via the network 240. Resources may include providing, for example, processing, storage, software, and information from the remote server 260 to the autonomous power base 120 via the network 240. In some embodiments, the remote server 260 may include autonomous driving algorithms for the autonomous power base 120 such that the autonomous power base 120 may drive autonomously by communicating with the remote server 260. In some embodiments, the autonomous power base 120 may receive data that is used for autonomous driving. For example, the autonomous power base 120 may receive map data from the remote server 260 based on the current location of the autonomous power base 120. As another example, the autonomous power base 120 may transmit raw data obtained by the one or more cameras 132 and the one or more proximity sensors 134 to the remote server 260 and receive processed data from the remote server 260. It should be understood that the network interface hardware 232 may be communicatively coupled to any number of servers by way of the network 240.

The network interface hardware 232 may be communicatively coupled to the network 240 and may communicate with a vehicle 270 via the network 240. In embodiments, the autonomous power base 120 may receive location information from the vehicle 270. For example, the autonomous power base 120 may receive the current location of the vehicle 270, and/or the destination of the vehicle 270. The autonomous power base 120 may also receive an internal map of the vehicle 270 from the vehicle 270. In some embodiments, the autonomous power base 120 may receive speed information from the vehicle 270.

The network interface hardware 232 may be communicatively coupled to the network 240 and may communicate with the user interface 114 via the network 240. In embodiments, the autonomous power base 120 may receive operation instructions from the user interface 114 and control the one or more electric motors 212 to drive the autonomous power base 120 based on the operation instructions.

Figure 3A:
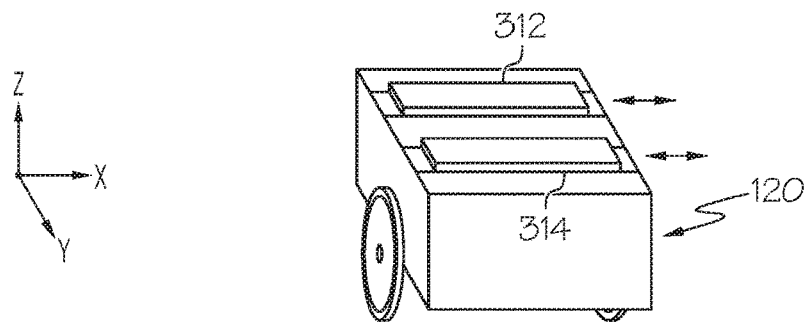
FIG. 3A depicts an autonomous power base that transfer an upper component to another power base, according to one or more embodiments shown and described herein.
Figure 3B:
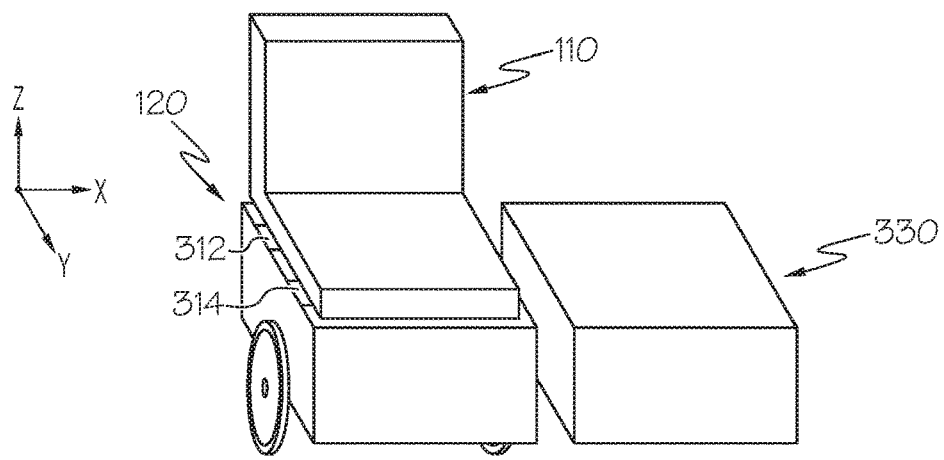
FIG. 3B depicts an autonomous power base that transfer an upper component to another power base, according to one or more embodiments shown and described herein.
Figure 3C:
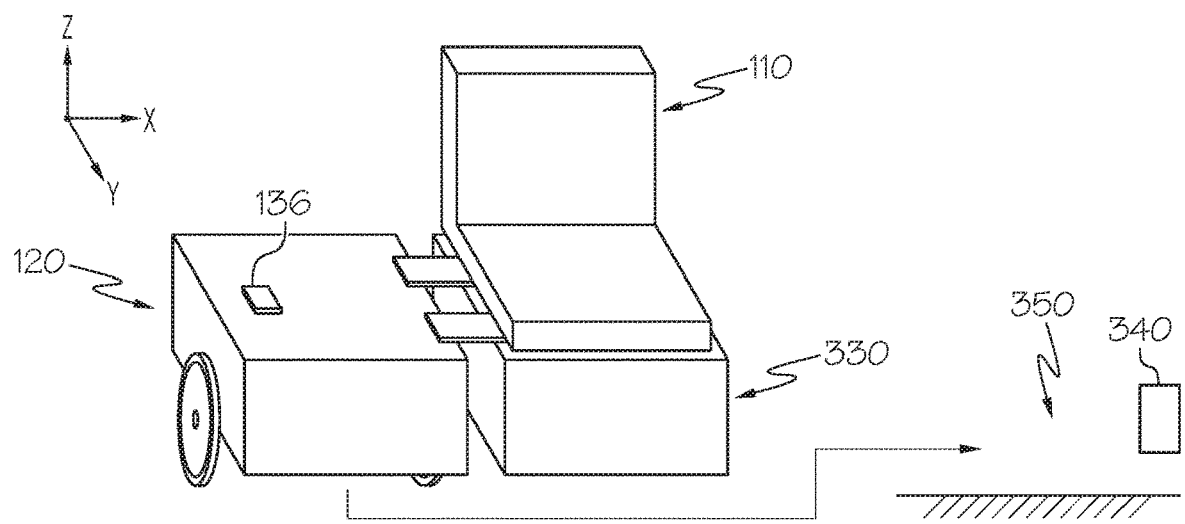
FIG. 3C depicts an autonomous power base that transfer an upper component to another power base, according to one or more embodiments shown and described herein.

FIGS. 3A through 3C depict transferring an upper component of a modular wheelchair to another base, according to one or more embodiments shown and described herein. Referring to FIG. 3A, the autonomous power base 120 may include a pair of sliding rails 312 and 314 which may slide along the +/− x axis direction. In some embodiments, the autonomous power base 120 may include a single sliding rail or more than two sliding rails. The sliding rails 312 and 314 may be operated by a motor (e.g., a linear motor) to move along the +/− x axis direction. The sliding rails 312 and 314 may be coupled to and support an upper component 110 that begins in a configuration in which it is coupled to the autonomous power base 120 as shown in FIG. 3B. The autonomous power base 120 may detect a manual base 330 using various sensors, for example, one or more cameras 132, one or more proximity sensors 134, etc., and align with the manual base 330 as shown in FIG. 3B. Then, the autonomous power base 120 may move the sliding rails 312 and 314 in +x direction such that the upper component 110 moves toward the manual base 330. In some embodiments, the manual base 330 may be coupled to a vehicle floor within a vehicle and configured to accept the upper component 110 such that a user on the upper component 110 may remain seated in the upper component 110 while the vehicle is traveling.

In FIG. 3C, the upper component 110 is placed on the manual base 330. The autonomous power base 120 determines that the upper component 110 is detached from the autonomous power base 120 after sliding the upper component 110 to the manual base 330. In some embodiments, the autonomous power base 120 determines that the upper component 110 is detached from the autonomous power base 120 when the coupling detection sensor 136 detects no object on the autonomous power base 120. In response to determination that the upper component 110 is detached from the autonomous power base 120, the autonomous power base 120 moves to a predetermined location 350. In embodiments, the autonomous power base 120 may move to a charging area where a charging device 340 is located and starts charging its batteries. In some embodiments, the autonomous power base 120 may move to a storage area within a vehicle. For example, in some embodiments, the autonomous power base 120 transfers the upper component 110 to one of the manual bases in a vehicle, and once it is determined that the upper component 110 is detached from the autonomous power base 120, the autonomous power base 120 may autonomously move to the back of the vehicle, or to a trunk bed. In some embodiments, the autonomous power base 120 may communicate with the vehicle and instruct the vehicle to conduct certain operations. For example, the autonomous power base 120 may communicate with the vehicle to open the trunk door in order to be able to enter the trunk and sit atop the trunk bed. (See, e.g., FIG. 11). As another example, the autonomous power base 120 may instruct the vehicle to open a rear door and provide a ramp such that the autonomous power base 120 may climb up the ramp. As another example, the vehicle may include a lift system, and the autonomous power base 120 may instruct the lift system to lift and put the autonomous power base 120 into the trunk bed.

While FIGS. 3A through 3C depict sliding rails as a mechanism for transferring the upper component 110 from the autonomous power base 120 to another base, any other mechanism may be used to transfer the upper component 110. For example, the autonomous power base 120 may include one or more lifting arms that lift the upper component 110 and transfer the upper component 110 to the manual base 330. As another example, the upper component 110 may be manually transferred from the autonomous power base 120 to the manual base 330 by a user.

Figure 4:
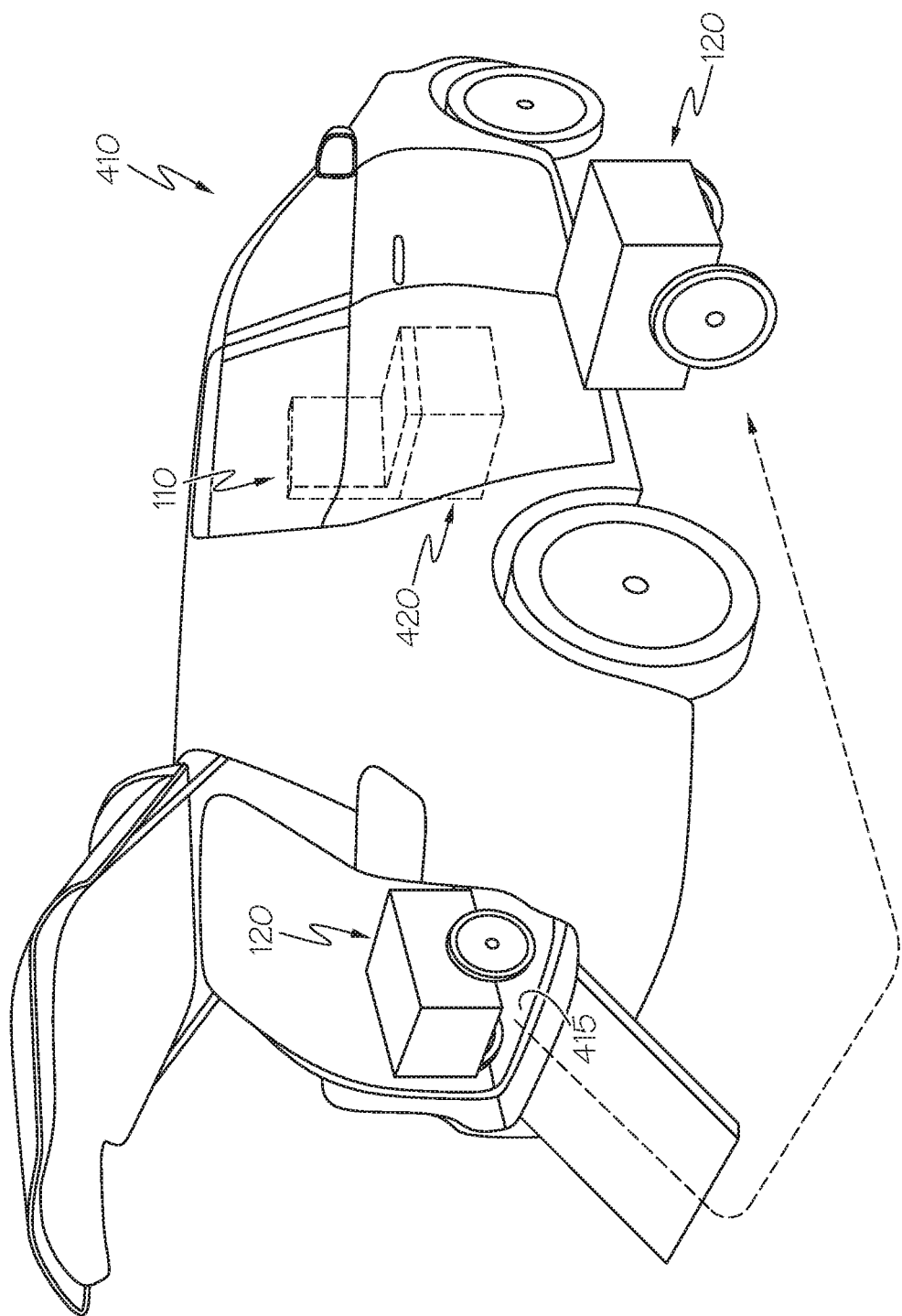
FIG. 4 depicts an autonomous power base and an upper component carried in a vehicle, according to one or more embodiments shown and described herein.

FIG. 4 depicts the autonomous power base locating the upper component and traveling to the upper component, according to one or more embodiments shown and described herein. In embodiments, the autonomous power base 120 and the upper component 110 are carried by a vehicle 410. The autonomous power base 120 may be placed on a trunk bed 415, and the upper component 110 may be placed on a manual base 420 which is attached to the floor of the vehicle 410. The autonomous power base 120 may communicate with the vehicle 410 and receive destination information from the vehicle 410. The autonomous power base 120 may determine whether the autonomous power base 120 arrives at the destination based on the destination information received from the vehicle 410. For example, the autonomous power base 120 may identify the current location of the autonomous power base 120 using, for example, the satellite antenna 222, and compare the current location with the destination information. If the current location is the same with the destination information, the autonomous power base 120 determines that the autonomous power base 120 arrived at the destination. As another example, the autonomous power base 120 may determine that the autonomous power base 120 arrived at the destination when the autonomous power base 120 receives a signal that the ignition of the vehicle 410 is turned off.

After determining that the autonomous power base 120 arrived at the destination, the autonomous power base 120 may locate the upper component 110 within the vehicle 410. For example, the autonomous power base 120 may receive location information about the upper component 110 from the vehicle 410. The vehicle 410 may identify the location of the upper component 110 within the vehicle 410 based on various sensors, for example, weight sensors on the manual base 420, a proximity sensor on the manual base 420 or an in-vehicle camera captures the image of the upper component 110 within the vehicle 410. In some embodiments, the autonomous power base 120 may identify the upper component 110 by capturing and processing images of the upper component 110 using the one or more cameras 132.

The autonomous power base 120 then moves to a predetermined location proximate to the upper component 110 in response to determination that the autonomous power base 120 arrives at the destination. For example, the autonomous power base 120 moves along the dotted line in FIG. 4 and stays in front of a door of the vehicle 410 which is next to the upper component 110. The autonomous power base 120 may instruct the vehicle 410 to open the corresponding door. Then, the autonomous power base 120 may receive the upper component 110 by employing various coupling mechanisms. For example, the autonomous power base 120 may extend sliding rails toward the upper component 110 placed on the manual base 420 and receive the upper component. As another example, one or more lifting arms of the autonomous power base 120 or the vehicle 410 may lift the upper component 110 and transfer the upper component 110 to the autonomous power base 120.

Figure 5:
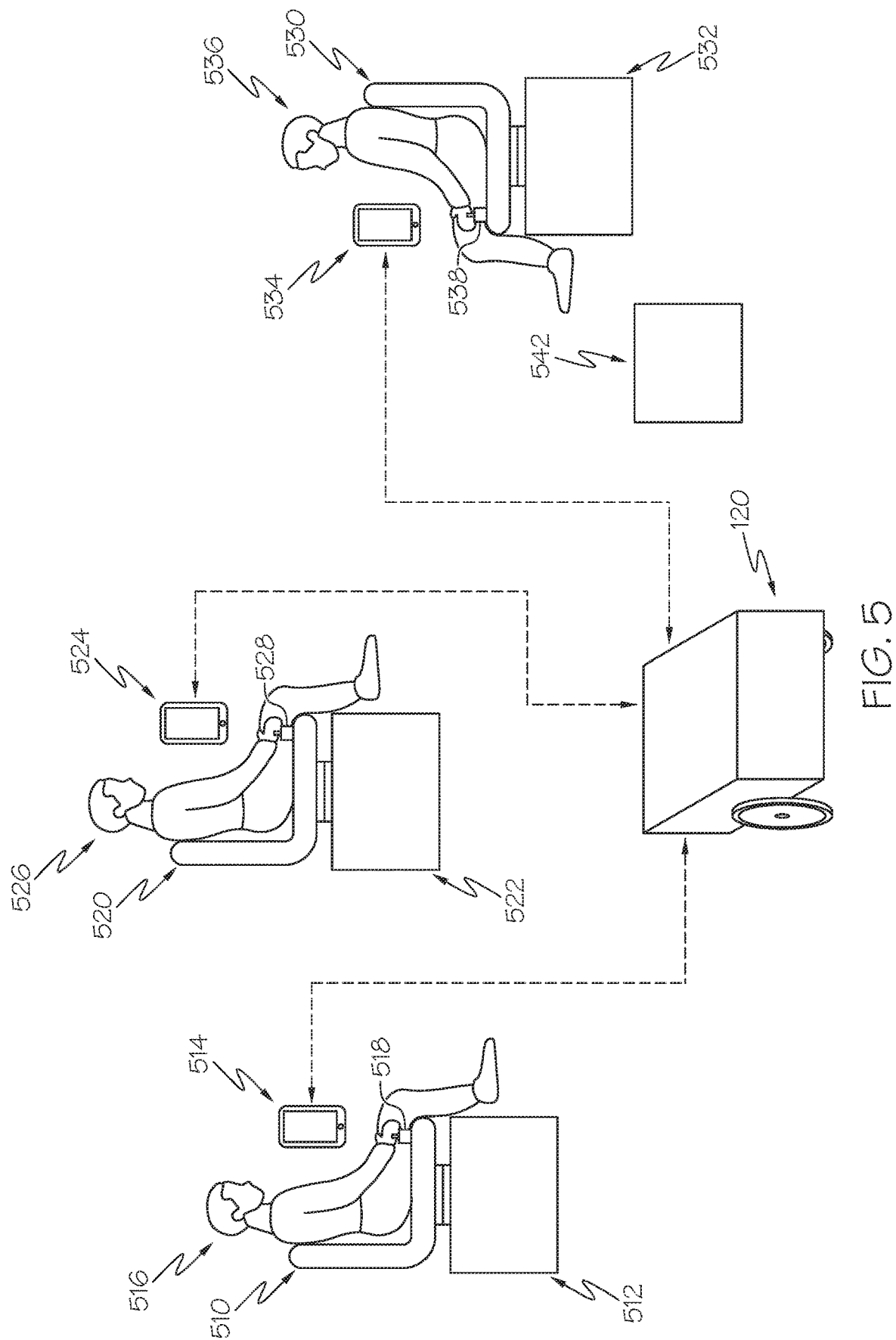
FIG. 5 depicts the autonomous power base accommodating a plurality of upper components, according to one or more embodiments shown and described herein.

FIG. 5 depicts the autonomous power base accommodating a plurality of upper components, according to one or more embodiments shown and described herein. In embodiments, a first upper component 510 is placed on a first manual base 512, a second upper component 520 is placed on a second manual base 522, and a third upper component 530 is placed on a third manual base 532. A first user 516 may sit on the first upper component 510, a second user 526 may sit on the second upper component 520, and a third user 536 may sit on the third upper component 530. In embodiments, the first user 516 may call the autonomous power base 120 using a mobile device 514 which sends a wireless signal to the autonomous power base 120. In another embodiment, the first user 516 may call the autonomous power base 120 using a user interface 518 which sends a wireless signal to the autonomous power base 120. The first user 516 may control the movement of the autonomous power base 120 by manipulating the user interface 518.

The autonomous power base 120 may receive the location of the mobile device 514 or the user interface 518, and drive to the first upper component 510. In embodiments, the autonomous power base 120 may transfer the first upper component 510 from the first manual base 512 to another manual base. For example, the autonomous power base 120 may receive the first upper component 510 and transfer the first user 516 to his designated location, for example, to a manual base 542, such that the first user 516 can interact with the third user 536.

Similarly, the second user 526 and the third user 536 may call the autonomous power base 120 and instruct the autonomous power base 120 to a designated location by manipulating the mobile device 524 or 534 or the user interface 528 or 538.

The embodiments described herein are directed to a modular wheelchair system. The modular wheelchair system includes an upper component, and an autonomous power base configured to detachably couple to the upper component. The autonomous power base includes one or more processors, one or more memory modules, and machine readable instructions stored in the one or more memory modules that, when executed by the one or more processors, cause the autonomous power base to: determine whether the upper component is separated from the autonomous power base; and navigate to a predetermined location in response to determination that the upper component is detached from the autonomous power base. The present modular wheelchair system allows a user to detach the upper component (e.g., a customized chair) from the power base and continue to use the upper component. For example, when the user enters a vehicle, he can continue to use the customized chair by placing the chair on a manual base within the vehicle. When the upper component is detached from the autonomous power base, the autonomous power base drives to a predetermined area autonomously such that the user does not need any help from a third party. In addition, because the autonomous power base is detached from the upper component, the autonomous power base may be placed within a relatively small space.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A modular wheelchair system, comprising:
   an upper component; and
   an autonomous power base configured to detachably couple to either of the upper component and an another upper component, the autonomous power base comprising:
   a controller configured to cause the autonomous power base to:
   determine whether the upper component is separated from the autonomous power base; and
   navigate to a location in response to determination that the upper component is detached from the autonomous power base,
   wherein one or more of the upper component and the another upper component comprises a user interface communicatively coupled to the autonomous power base and configured to output instructions for operating the autonomous power base.

2. The modular wheelchair system of claim 1, wherein:
the autonomous power base comprises one or more sensors configured to detect objects proximate to the autonomous power base; and
the controller is configured to cause the autonomous power base to navigate to the predetermined location based on data received from the one or more sensors.

3. The modular wheelchair system of claim 2, wherein the one or more sensors include at least one of a laser scanner, a capacitive displacement sensor, a Doppler Effect sensor, an eddy-current sensor, an ultrasonic sensor, a magnetic sensor, an optical sensor, a radar sensor, a sonar sensor, a LIDAR sensor.

4. The modular wheelchair system of claim 1, wherein:
the autonomous power base comprises one or more cameras configured to capture objects proximate to the autonomous power base; and
the controller is configured to cause the autonomous power base to navigate to the location based on images captured by the one or more cameras.

5. The modular wheelchair system of claim 1, wherein the autonomous power base comprises one or more rails configured to transfer the upper component to another base.

6. The modular wheelchair system of claim 1, wherein the autonomous power base comprises one or more sensors configured to detect a coupling of the upper component to the autonomous power base.

7. The modular wheelchair system of claim 1, wherein the autonomous power base comprises one or more modular wheels.

8. The modular wheelchair system of claim 1, wherein the location is a charging station configured to charge the autonomous power base.

9. An autonomous power base for a modular wheelchair system comprising
a coupling mechanism configured to couple with an upper component;
network interface hardware; and
a controller configured to:
receive location information related to another upper component placed on another base using the network interface hardware;
determine whether the upper component is detached from the autonomous power base; and
navigate to a location of the another upper component based on the location information related to another upper component and determination that the upper component is detached from the autonomous power base.

10. The autonomous power base of claim 9, wherein:
the autonomous power base comprises one or more sensors configured to detect objects proximate to the autonomous power base; and
the controller is configured to cause the autonomous power base to navigate to a second location based on data received from the one or more sensors.

11. The autonomous power base of claim 10, wherein the one or more sensors include at least one of a laser scanner, a capacitive displacement sensor, a Doppler Effect sensor, an eddy-current sensor, an ultrasonic sensor, a magnetic sensor, an optical sensor, a radar sensor, a sonar sensor, a LIDAR sensor.

12. The autonomous power base of claim 9, wherein the autonomous power base comprises one or more sensors configured to detect a coupling of the upper component to the autonomous power base.

13. The autonomous power base of claim 9, wherein the autonomous power base comprises one or more modular wheels.

14. A modular wheelchair system, comprising:
an upper component; and
an autonomous power base configured to detachably couple to the upper component, the autonomous power base comprising:
a controller configured to:
determine whether the autonomous power base arrives at a destination;
locate the upper component detached from the autonomous power base;
move to a predetermined location proximate to the upper component in response to determination that the autonomous power base arrives at the destination, and
cause the autonomous power base to receive information on the destination from the vehicle, wherein the autonomous power base and the upper component are positioned within a vehicle.

15. The modular wheelchair system of claim 14, wherein:
the controller is configured to cause the autonomous power base to receive location information of the upper component from the vehicle.

16. The modular wheelchair system of claim 14, wherein the controller is configured to cause the autonomous power base to extend one or more rails configured to receive the upper component.

17. The modular wheelchair system of claim 14, wherein the autonomous power base comprises one or more sensors configured to detect the upper component.

* * * * *